(12) United States Patent
Hines et al.

(10) Patent No.: US 9,077,587 B2
(45) Date of Patent: Jul. 7, 2015

(54) SYSTEM AND METHOD FOR PROVIDING NETWORK SERVICES OVER SHARED VIRTUAL PRIVATE NETWORK (VPN)

(71) Applicant: Level 3 Communications LLC, Broomfield, CO (US)

(72) Inventors: Marcus Hines, Westminster, CO (US); Daryl Malas, Broomfield, CO (US); Jaime Miles, Arvada, CO (US); Gary Ratterree, Louisville, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 13/959,513

(22) Filed: Aug. 5, 2013

(65) Prior Publication Data

US 2013/0315101 A1    Nov. 28, 2013

Related U.S. Application Data

(63) Continuation of application No. 12/334,942, filed on Dec. 15, 2008, now Pat. No. 8,503,334.

(60) Provisional application No. 61/013,907, filed on Dec. 14, 2007.

(51) Int. Cl.
*H04L 29/08* (2006.01)
*H04L 12/931* (2013.01)
*H04L 12/46* (2006.01)

(52) U.S. Cl.
CPC .......... *H04L 29/0836* (2013.01); *H04L 49/354* (2013.01); *H04L 12/4645* (2013.01)

(58) Field of Classification Search
CPC ............ H02L 29/0836; H02L 12/4645; H02L 49/354
USPC .......................... 370/230, 231, 254, 255, 392
See application file for complete search history.

(56) References Cited

U.S. PATENT DOCUMENTS

| | | | |
|---|---|---|---|
| 6,778,798 B2 * | 8/2004 | Kitahara ....................... 399/228 |
| 7,072,346 B2 | 7/2006 | Hama | |
| 7,272,146 B2 | 9/2007 | Yamauchi | |
| 7,420,933 B2 * | 9/2008 | Booth et al. ................... 370/254 |
| 7,447,151 B2 * | 11/2008 | McDysan ..................... 370/231 |
| 7,535,856 B2 * | 5/2009 | Booth et al. ................... 370/255 |
| 7,564,802 B2 | 7/2009 | Andrapalliyal et al. | |
| 7,593,352 B2 | 9/2009 | Verma | |
| 7,630,310 B2 | 12/2009 | Bapat et al. | |
| 7,631,059 B2 | 12/2009 | Chang et al. | |
| 7,643,488 B2 | 1/2010 | Khanna et al. | |
| 7,715,380 B2 | 5/2010 | Somasundaram | |
| 7,747,777 B2 | 6/2010 | Previdi et al. | |
| 7,809,860 B2 * | 10/2010 | McDysan ..................... 709/249 |
| 8,543,734 B2 * | 9/2013 | Mcdysan ...................... 709/249 |

(Continued)

*Primary Examiner* — Jay P Patel

(57) ABSTRACT

A network architecture includes an edge network having provider edge nodes configured to form a core network service VPN logically between subscribing customer network sites and a core service network, the core service network providing a core network service, the core service network including a core network service node, and a plurality of customer network sites having customer edge nodes attached to associated provider edge nodes of the edge network, wherein each customer edge node is configured to import routes tagged with a core service specific route target, and wherein the core network service node is configured to import routes tagged with a core service specific customer route target.

14 Claims, 7 Drawing Sheets

(56) References Cited

U.S. PATENT DOCUMENTS

| | | |
|---|---|---|
| 8,774,047 B2 * | 7/2014 | Kulmala et al. ............... 370/254 |
| 2002/0037010 A1 | 3/2002 | Yamauchi |
| 2002/0163889 A1 | 11/2002 | Yemini et al. |
| 2003/0016672 A1 | 1/2003 | Rosen et al. |
| 2003/0079043 A1 | 4/2003 | Chang et al. |
| 2003/0112755 A1 * | 6/2003 | McDysan ..................... 370/230 |
| 2004/0095947 A1 | 5/2004 | Luciani et al. |
| 2004/0202171 A1 | 10/2004 | Hama |
| 2004/0208122 A1 * | 10/2004 | McDysan ..................... 370/230 |
| 2005/0066053 A1 | 3/2005 | Mcdysan |
| 2006/0013209 A1 | 1/2006 | Somasundaram |
| 2007/0070982 A1 | 3/2007 | Croak et al. |
| 2007/0133406 A1 | 6/2007 | Vasseur |
| 2007/0140250 A1 | 6/2007 | McAllister et al. |
| 2007/0286393 A1 | 12/2007 | Roever et al. |
| 2008/0170578 A1 | 7/2008 | Ould-Brahim |
| 2008/0232379 A1 | 9/2008 | Mohamed et al. |
| 2009/0092125 A1 | 4/2009 | Hoover et al. |
| 2009/0144390 A1 | 6/2009 | Previdi et al. |
| 2009/0154463 A1 | 6/2009 | Hines et al. |

\* cited by examiner

SYSTEM AND METHOD FOR PROVIDING NETWORK SERVICES OVER SHARED VIRTUAL PRIVATE NETWORK (VPN)

RELATED APPLICATIONS

The present application claims priority to and is a continuation of co-pending U.S. patent application Ser. No. 12/334,942, entitled "System and Method for Providing Network Services Over Shared Virtual Private Network (VPN)" filed on Dec. 15, 2008, which claims benefit under 35U.S.C. §119 (e) to U.S. Provisional Patent Application No. 61/013,907, filed Dec. 14, 2007, both of which are incorporated by reference herein for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2007-2013 Level 3 Communications, LLC.

TECHNICAL FIELD

Embodiments of the present invention generally relate to network communications. More specifically, embodiments relate to providing a network service over a virtual private network (VPN). More specifically still, embodiments relate to systems and methods for providing a network service over a shared VPN.

BACKGROUND

A virtual private network (VPN) is a secure network tunneled through another network, which is often public and insecure. A VPN is typically dedicated to an enterprise, such as a corporation, and is securely accessible to users in the enterprise through the use of encryption. An encryption protocol, such as point-to-point tunneling protocol (PPTP), is typically used. Encryption and decryption are handled by firewalls, routers or other nodes on the VPN. A Voice over Internet Protocol (VoIP) VPN combines VoIP technology with VPN technology to form a secure network for carrying voice over a public network.

To provide VoIP VPN service, for example, one or more enterprise nodes are typically coupled to nodes of a VoIP VPN service provider network. These nodes are then provisioned with the appropriate data and settings to support the VoIP VPN service. In conventional approaches a separate trunk or IP security tunnel typically must be provisioned between each enterprise network (e.g., a customer edge device) and a voice service border device of the provider network. On each of these trunks, data security should be implemented. As such, conventional approaches impose great overhead to providing VoIP VPN service.

It is with respect to these and other problems that embodiments of the present invention have been created.

SUMMARY

Embodiments of the present invention generally relate to network communications. More specifically, embodiments relate to providing a network service over a virtual private network (VPN). More specifically still, embodiments relate to systems and methods for providing a network service over a shared VPN.

An embodiment of a method for providing a core network service to one or more customers having a plurality of network sites includes tagging first customer routes with a core network service specific customer route target to form a first core network service virtual private network (VPN) logically between a core service network configured to provide the core network service and each of the network sites among the plurality of network sites of a first customer; and tagging the first customer routes with a first customer specific route target to form a first enterprise VPN logically between network sites of the plurality of network sites of the first customer.

The method may further include tagging second customer routes of a second customer with the core network service specific customer route target to form a second core network service VPN logically between the core service network and one or more network sites of a second customer. The method may still further include tagging the second customer routes with a second customer specific route target to form a second enterprise VPN logically between a plurality of second customer network sites.

Further still, the method may include delivering the core network service to the first customer and the second customer using first customer routes and second customer routes tagged with the core network service specific customer route target. The method may further include a provider edge node importing first customer routes tagged with the core network service specific customer route target; and advertising the first customer routes tagged with the core network service specific customer route target toward the core service network.

In accordance with one embodiment, a plurality of provider edge nodes may be configured to advertise the first customer routes tagged with the core network service specific customer route target toward the core service network. When the first customer subscribes to another core network service, and the method may further include forming another core network service virtual private network (VPN) logically between another core service network configured to provide the another core network service and each of the plurality of network sites of the first customer, wherein forming the another core network service VPN comprises tagging the first customer routes with another core network service specific customer route target associated with the another core network service.

Another embodiment of a method for providing a network service to a customer includes configuring a provider edge node to import core node routes from a core network service node coupled to a service network operable to provide the service, configuring the provider edge node to advertise the core node routes to at least one customer edge node of a customer subscribing to the core network service, configuring the provider edge node to import customer routes from the customer edge node, and configuring the provider edge node to advertise the customer routes to one or more other customer edge nodes and the core network service node, whereby an enterprise VPN is formed logically between customer edge nodes and a core network service VPN is formed logically between customer edge nodes and the core network service node.

In one embodiment, configuring the provider edge node includes configuring a virtual routing and forwarding (VRF) table in the provider edge node. The customer routes may be tagged with a customer specific route target and a core network service specific customer route target. The core node routes may be tagged with a core network service specific route target. Customer edge nodes may be configured to import routes tagged with the core network service specific route target and the core network service node is configured to import routes tagged with the core service specific customer route target. The core network service node may be configured to export the core node routes tagged with the core service specific route target.

Yet another embodiment of a method for providing a core network service to one or more customers includes tagging core routes of a core network service node associated with the core network service with an assigned core service specific route target, and distributing the core routes tagged with the assigned core service specific route target to one or more customers subscribing to the core network service associated with the core service node, whereby the customers are enabled to reach the core network service node via a core network service Virtual Private Network (VPN). The method may further include importing, by the core network service node, customer routes tagged with core network service specific customer route targets, whereby the core network service node is enabled to reach one or more customer edge nodes via the core network service VPN.

Further still, the method may include assigning one or more core service specific route targets to each of one or more core network services, wherein each of the one or more core network services is provided by an associated core network service node and core service network. The method may further include assigning one or more customer specific route targets to each of the one or more subscribing customers. The one or more subscribing customers may include a plurality of subscribing customers and the core network service VPN comprises a shared core network service VPN. The core network service may be selected from a group comprising an Internet Protocol (IP) service, extended voice service, a video service, or Content Distribution Network (CDN) service. The core network node may be selected from a group comprising a session border controller (SBC), an H.323 gatekeeper, a Session Initiation Protocol (SIP) proxy, a media gateway, a video gateway, or an H.264 gateway.

The method may further include configuring one or more provider edge nodes to import core routes tagged with the assigned core service specific route targets; and configuring the one or more provider edge nodes to distribute the core routes to customer edge devices attached to the one or more provider edge nodes. The method may still further include configuring each of the one or more customer edge nodes to tag associated customer routes with a customer specific route target and a core service specific customer route target, wherein the customer specific route target is used to form an enterprise VPN logically between customer edge nodes of the same customer, and wherein the core service specific customer route target is used to form the core network service VPN.

An embodiment of a network architecture for providing one or more core network services to a plurality of customers includes at least one edge network having provider edge nodes configured to form one or more core network service VPN logically between subscribing customer network sites and respective core service networks, one or more core service networks providing respective core network services, each core service network including a core network service node, and a plurality of customer network sites having customer edge nodes attached to associated provider edge nodes of the at least one edge network, wherein each customer edge node is configured to import routes tagged with a core service specific route target associated with a core network service subscribed to, and wherein each of the one or more core network service nodes is configured to import routes tagged with a core service specific customer route target.

Figure 1:
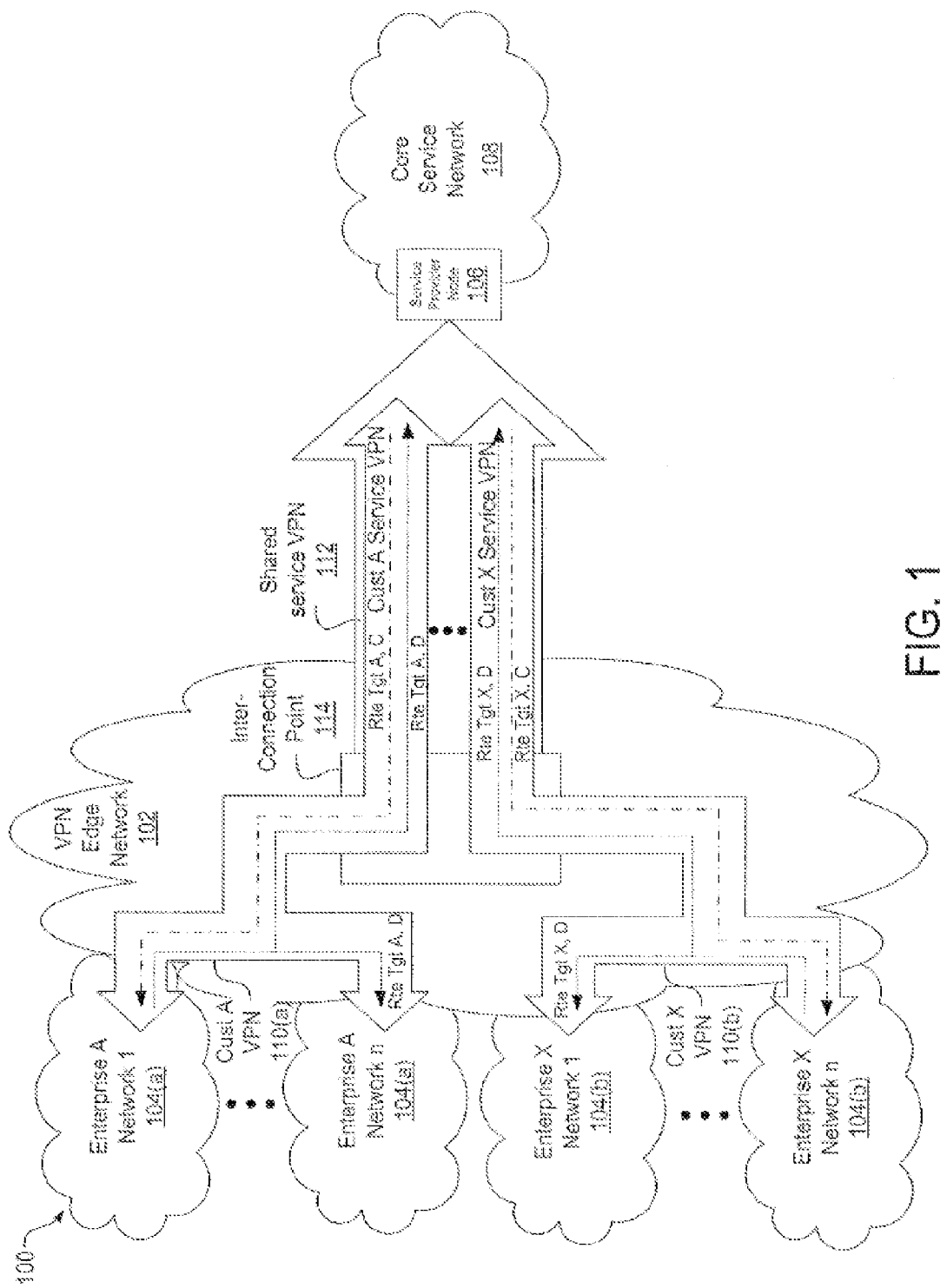
FIG. 1 illustrates a network architecture suitable for providing a network service to multiple customers via virtual private network (VPN) in accordance with an embodiment.

While the invention is amenable to various modifications and alternative forms, specific embodiments have been shown by way of example in the drawings and are described in detail below. The intention, however, is not to limit the invention to the particular embodiments described.

DETAILED DESCRIPTION

Embodiments of the present invention generally relate to network communications. More specifically, embodiments relate to providing a network service over a virtual private network (VPN). More specifically still, embodiments relate to systems and methods for providing a network service over a shared VPN.

An embodiment of a method for providing a core network service comprises forming a core network service VPN logically between one or more enterprise networks of a customer. The method may further include forming an enterprise VPN logically between enterprise networks of the customer. Multiple core network service VPNs can be formed between customer enterprise networks and associated core service networks.

In some embodiments, communities of interest can be formed wherein multiple customers may be included in an enterprise VPN. One or more core service networks may be included in a community of interest. In some embodiments, a customer may be part of more than one community of interest. A customer may subscribe to a core network service, whereby the associated core service network is in a community of interest of the customer. Many other community of interest arrangements of customers and core service networks can be formed. For example, a community of interest may include a first customer, a second customer and a first core service network; another community of interest may include the first customer and a second core service network, but not the second customer.

Some embodiments of the method include assigning route targets in a manner that supports formation of customer enterprise networks and core network service VPNs. For example a core service specific route target is assigned to each core network service, where the route target identifies the associated core network service. Each core network service is assigned a core service specific customer route target that subscribing customers can use to advertise their routes to the associated core network service node. Each customer is assigned a customer specific route target. Each community of interest may or may not be assigned a route target. Using the assigned route targets, network nodes, such as provider edge nodes, customer edge nodes and core nodes can be configured to form specified VPNs.

Although different customers may share a core network service via VPN, there is generally no cross-communication between customer VPNs. However, it is possible to allow for cross-communication between VPNs when arrangements (e.g., peering relationships or other agreements between customers) exist between multiple customers.

In one embodiment of a method, sending the customer network routes includes sending route targets associated with the customer VPNs. Sending route targets can include advertising Multi-Protocol Label Switching (MPLS) route targets. The network service may include one or more of an Internet Protocol (IP) service, Voice Over IP (VoIP) service, a video service, voice termination service, or Content Distribution Network (CDN) service. The network node may be a session border controller (SBC), an H.323 gatekeeper, a Session Initiation Protocol (SIP) proxy, a media gateway, a video gateway, or an H.264 gateway.

An embodiment of a network architecture for providing a core network service to multiple customers includes a core node providing access to a core network associated with the core network service, and an edge node coupled to the network core node, the edge node configured to import a core service specific route target and distribute the core service specific route target to attached CEs of a subscribing customer. CEs export their routes tagged with a customer specific route target and a core service specific customer route target. The PEs distribute routes tagged with the customer specific route target to other PEs and distribute routes tagged with the core service specific customer route target to the associated core network service node. The core node may be a session border controller (SBC), an H.323 gatekeeper, a Session Initiation Protocol (SIP) proxy, a media gateway, a video gateway, or an H.264 gateway. The network service may include one or more of an Internet Protocol (IP) service, Voice Over IP (VoIP) service, a video service, voice termination service, or Content Distribution Network (CDN) service.

Some embodiments of a network architecture include a plurality of edge nodes with each of the edge nodes coupled to a core node associated with a different network service. Each core node controls access to a core service network providing the network service associated with the core node. Each core node is configured to advertise its assigned route target so that subscribing customers can access the associated network service. Each of the edge nodes is configured to advertise the network service route target to the subscribing customer networks.

Request for Comment 2547 (E. Rosen, "RFC 2547-BGP/MPLS VPNs", The Internet Society, March 1999), which is incorporated herein by reference for all purposes, describes a method by which a Service Provider with an IP backbone may provide Virtual Private Networks (VPNs) for its customers. Generally, Multiprotocol Label Switching (MPLS) is used for forwarding packets over the backbone, and Border Gateway Protocol (BGP) is used for distributing routes over the backbone. The primary goal of this method is to support the outsourcing of IP backbone services for enterprise networks. It does so in a manner which is simple for the enterprise, while still scalable and flexible for the Service Provider, and while allowing the Service Provider to add value. These techniques can also be used to provide a VPN which itself provides IP service to customers.

Embodiments described herein provide methods for forming core network service VPNs to one or more customers, while also enabling customer-specific enterprise VPNs to each of the customers. Multiple customers can share a core network service via VPN while still maintaining separation between each of the customers' core network service VPNs and customer-specific VPNs. Each customer can subscribe to multiple core network services, wherein each core network service can be provided over an associated core network service VPN.

Prior to describing one or more preferred embodiments of the present invention, definitions of some terms used throughout the description are presented.

Definitions

The term "core network service" refers to a service that is provided, at least in part, via a core network. While one or more edge networks may, and typically do, facilitate providing the core network service, a core network service can be distinguished from other network services that do not require a core network. For example, basic data VPN and VoIP VPN can be provided without use of a core network; basic data VPN and VoIP VPN can be provided through one or more edge networks. Examples of core network services include, but are not limited to, video services, content delivery services, or extended voice services (e.g., voice termination).

A "module" is a self-contained functional component. A module may be implemented in hardware, software, firmware, or any combination thereof.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The terms "responsive" and "in response to" includes completely or partially responsive.

The term "computer-readable media" is media that is accessible by a computer, and can include, without limitation, computer storage media and communications media. Computer storage media generally refers to any type of computer-readable memory, such as, but not limited to, volatile, non-volatile, removable, or non-removable memory. Communication media refers to a modulated signal carrying computer-readable data, such as, without limitation, program modules, instructions, or data structures.

Exemplary System

FIG. 1 illustrates an example network environment 100 in accordance with one embodiment. The network environment 100 includes one or more virtual private network (VPN) edge networks 102 providing VPN service to customer enterprise networks 104. The VPN edge network 102 connects the customer enterprise networks 104 to a core service network 106. Enterprise VPNs and shared service VPNs can be formed in the network environment 100.

In some embodiments, enterprise VPNs 110 can be formed where each VPN 110 includes networks of a given enterprise. For example, enterprise VPN 110(*a*) includes enterprise A network 1 104(*a*) through enterprise A network n 104(*a*). Similarly, enterprise VPN 110(*b*) includes enterprise B network 1 104(*b*) through enterprise B network n 104(*b*). Enterprise networks 104 can correspond to enterprise sites.

In some embodiments, one or more core network service VPNs can be formed that include the core service network 106 and one or more customer enterprise networks 104 of a customer. For example, a core network service VPN 112(a) includes the core service network 106 and enterprise A network 1 104(a) through enterprise A network n 104(a). As another example, core network service VPN 112(b) includes the core service network 106 and enterprise B network 1 104(b) through enterprise B network n 104(b). Because two enterprises are using the core network service in the environment 100 of FIG. 1, the core network service VPNs 112 are referred to as shared service VPNs.

In accordance with at least one embodiment, multiple shared service VPNs 112 operate over a single network link. For example, the shared service VPNs 112 may operate over a single trunk (e.g., fiber or copper). By using a single link for multiple shared service VPNs 112, overhead can be reduced as compared to conventional approaches where a separate trunk or IP security tunnel is created between each enterprise network 104 and the core service network 106.

In various embodiments, Border Gateway Protocol (BGP) and Multiprotocol Label Switching (MPLS) are used to create the enterprise VPNs 110 and the core network service VPNs 112. In these embodiments, route targets are assigned to routes that enable a configured distribution of routes. Virtual Routing and Forwarding (VRF) technology is used to configure provider edge and customer edge nodes. The PE and CE nodes are configured so that the proper route targets are imported and exported in order to form the appropriate VPNs. Route targets are tagged to routes to ensure that the routes are distributed to the proper network nodes. A route target is generally a 64 bit value, but for ease of discussion, route targets discussed here are represented as capital letters.

For example, in the illustrated embodiment, route target A is tagged to routes of customer A that should be distributed to all of customer A's network sites. Similarly route target B is tagged to routes of customer A that should be distributed to all of customer A's network sites. Route target C is tagged to routes to the core service network so that nodes of the customer enterprise networks can reach the core service network, and route target D is tagged to customer A and customer B routes so that nodes of the core service network can reach customer A networks 104(a) and customer B networks 104(b). As such, customer routes are tagged with at least two route targets: the route target assigned to the customer routes to be used by other enterprise networks, and the route target assigned to routes to be used by a node in the core service network.

In the simplified example illustrated in FIG. 1, enterprise A networks 104(a) export routes tagged with route target A and route target D. Enterprise A networks 104(a) import routes tagged with route target A and route target C. Enterprise B networks 104(b) export routes tagged with route target B and route target D; and import routes tagged with route target B and route target C. The core service network 106 imports routes tagged with route target D and exports routes tagged with route target C. Provider edge (PE) nodes in the edge network(s) 102 are configured to ensure that packets are communicated to the correct VPNs.

In some embodiments, customer route targets, such as route target A and route target B, which are associated with specific customer enterprise VPNs, are referred to as customer specific route targets. Route targets, such as route target D, which are tagged to customer routes to be used by a core service node may be referred to as core service specific customer route targets. Route targets, such as route target C, which are tagged to core service node routes are referred to as core service specific routes. When multiple core network services are available, each core network service will be assigned its own core service specific customer route target, which can be used by each customer subscribing to that core network service to advertise the subscribing customer's routes to the specific core network service.

In some embodiments, network nodes, such as provider edge nodes (PEs), customer edge nodes (CEs) and provider core nodes (Ps) can be configured through software. The nodes can be configured remotely from a network operations or administrative center. This approach can enable the service provider to "turn on" a core service VPN to which a customer subscribes substantially immediately after the customer subscribes to the core service. As discussed further below with respect to FIG. 3, any given customer can subscribe to multiple core network services, and one or more of those core network services can be provided over a core service VPN.

As such, in various embodiments, the following scheme can be used to set up VPNs using route target manipulation:
  inter-customer (i.e., between different customers) route target advertising is prevented;
  intra-customer (i.e., between different enterprise network sites of the same customer) route target advertising is permitted;
  customer to core service node advertising is permitted;
  core service node to customer advertising is permitted.

Figure 2:
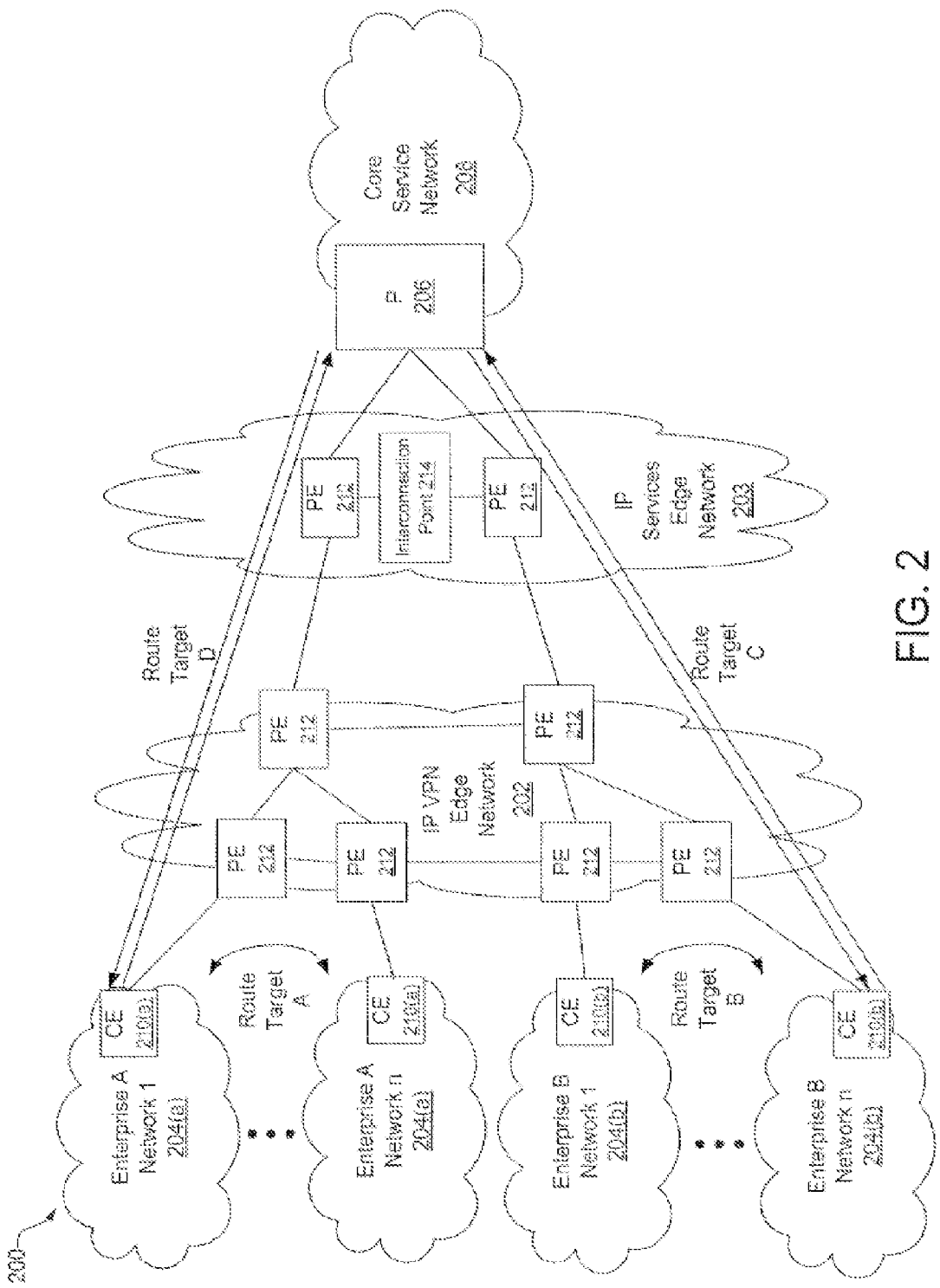
FIG. 2 illustrates another network architecture suitable for providing a network service to multiple customers via a virtual private network (VPN) in accordance with the embodiment of FIG. 1 or other embodiments.
Figure 3:
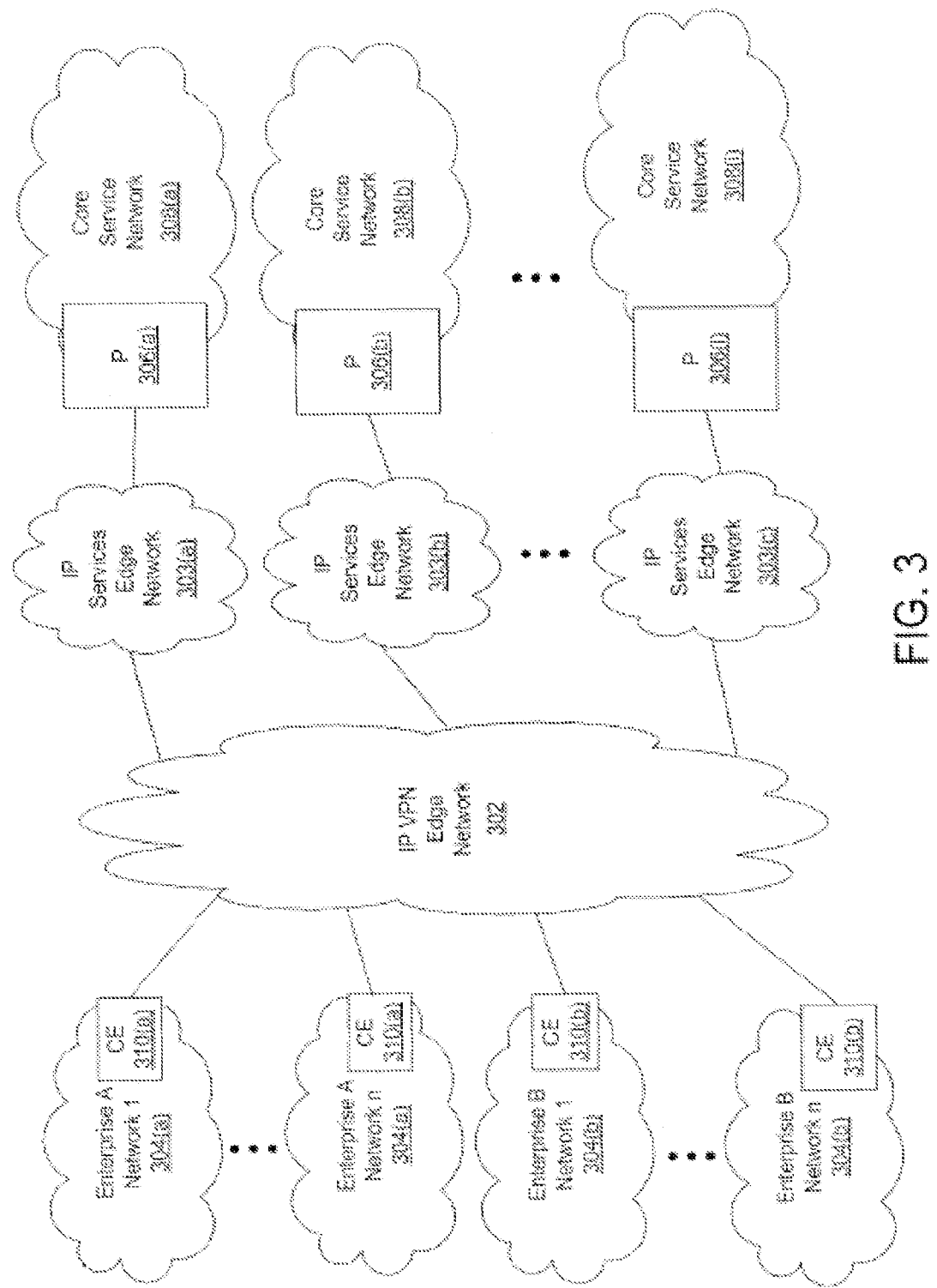
FIG. 3 illustrates another network architecture suitable for providing multiple network services via virtual private network (VPN) in accordance with one embodiment.

FIG. 2 illustrates a simplified network architecture 200 that could be used in accordance with the embodiment of FIG. 1 to provide one or more core network services to multiple enterprise networks 204 via VPN. The particular embodiment of FIG. 2 includes two VPN edge networks: IP VPN edge network 202 and IP services edge network 203. In this configuration, a provider that has an existing IP VPN edge network, such as IP VPN edge network 202, which provides general VPN service (i.e., VPN data service), can deploy one or more IP services edge networks logically between the IP VPN edge network 202 and one or more associated core service networks 208. FIG. 3, discussed further below, illustrates an embodiment including multiple IP service edge networks between the IP VPN and respective core service networks providing respective core network services.

Customer facing PEs 212 of the IP VPN edge network 202 have CE 210 peers. For example, each PE 212(a) is attached to a CE 210(a) of an enterprise A network 204(a). Similarly, each PE 212(b) is attached to a CE 210(b) of an enterprise B network 204(b). PEs 212 and CEs 210 are configured using VRF technology to import selected route targets and to export selected route targets. Each customer facing PE 212 is configured to import routes of the customer route targets from their attached peer CE 210. Each customer facing PE 212 is also configured to export the customer routes to other customer facing PEs 212. Customer routes received from other customer facing PEs 212 are exported to, and imported by, the attached CE 210.

For example, each customer facing PE 212(a) imports routes from the attached CE 210(a) that are tagged with the customers assigned route target (e.g., route target "A"). Each PE 212(a) exports the customer routes to the other customer facing PE 212(a). Customer routes received from the other customer facing PE 212(a) are exported to the attached CE 210(a). This approach enables all CEs 210(a) to reach all other CEs 210(a) in the enterprise A VPN.

In various embodiments, customer facing PEs 212(a) and 212(b) also import routes tagged with a route target assigned to the customer for the core network service (e.g., route target "D"). The customer facing PEs 212 distribute routes having the customer core network service route target, in this case route target D, to other edge network PEs 212(c). The PEs 212(c) distribute routes of route target D to PEs 212(d) of the IP services edge network 203. The PEs 212(d) export route target D routes to a core service network node 206. The core service node 206 generally controls access to the core service network 208. By way of example, the core service node 206 could be a Session Border Controller (SBC), an H.323 gatekeeper, a Session Initiation Protocol (SIP) proxy, a media gateway, a video gateway, or an H.264 gateway. The core service network node 206 is configured to import routes tagged with route target D. As such, the core service network node 206 will be able to reach CEs 210(a) and CEs 210(b) and communicate packets related to the core service to the CEs 210.

The core service network node 206 is also configured to export the core nodes routes with a core service node route target. In the illustrated example, the core service node route target is represented by route target "C". The IP services edge network 203 PEs 212(d) are configured to import routes of route target C and distribute them to PEs 212(c), which in turn are configured to distribute route target C routes to the customer facing PEs 212(a), 212(b). The customer facing PEs 212(a) and 212(b) are configured to distribute the routes tagged with route target C to the attached CEs 210(a) and 210(b), respectively. The CEs 210 are configured to import route target C routes. As such, the CEs 210 are able to reach and communicate packets to the core service network node 206.

In accordance with some embodiments, CEs 210 of a given customer are not configured to import routes tagged with other customer route targets or customer core service route targets. This ensures that a given customer will not become part of another customer's enterprise VPN or core network service VPN. For example, CEs 210(a) of enterprise A are configured to not import route target B and route target D, which are exported by CEs 210(b).

In other embodiments, a customer may want to be able to be included in other customer's VPNs. If both customers agree, the CEs of the customers can be configured to import routes tagged with the other customer's route target. Such a situation may arise when, for example, two customers merge into the same parent company. As such, customer subscriptions can include a feature of inter-customer VPN visibility. In some embodiments, customers who want this sort of inter-customer VPN visibility can notify the service provider through a subscription service feature selection.

Routes imported by each PE 212(d) are exported to the other PE(s) 212(d) in the IP services edge network 203, so that all PEs 212(d) in the IP services edge network 203 can reach the same routes.

In the embodiments described here, the Border Gateway Protocol (BGP) is used between networks and Multiprotocol BGP (MPBGP) is used within the edge networks to advertise routes. During MPBGP within edge network 202, each PE 212 determines if it needs a route target that it receives, based on the PE's 212 VRF configuration. If the PE 212 is configured to import a received route target, the PE 212 imports the identified routes; otherwise the PE 212 does not import the identified routes.

Using VRF technology to configure PE nodes 212, communities of interest can be formed that include networks selected for the community. For example, one community of interest may include all network sites of enterprise A and one or more core service networks. A community of interest can be expanded to include more enterprise sites and even other customer sites, based on the VRF configurations.

FIG. 3 illustrates another exemplary network configuration 300 for providing multiple network services over VPN in accordance with an embodiment In this particular embodiment, there are multiple core service networks 308(a) . . . 308(i), with each core service network having an associated core service node (P) 306(a) . . . 306(i) that controls access to the core service network 308. A network service is provided by or through each core service network 308. For example, VoIP service may be provided through core service network 308(a); content delivery maybe provided through core service network 308(b), and so on. Enterprises 304 can subscribe to network services provided by the core service networks 308. Each network service and/or its associated core service node 306 is assigned a route target with which customer network nodes can access the network service.

The system (e.g., provider edge nodes of the system) is configurable so that enterprise customer edge nodes 310 receive advertisements of route targets assigned to the network services to which the customer subscribes. As such, each customer can subscribe to one or more network services and receive only the route target advertisements for the network services subscribed to. Of course, if a customer cancels its subscription to a network service, the customer network 304 stops receiving the advertisement associated with that network service.

In general, the IP services edge networks 303 form shared VPNs between customer networks 204 and the associated P device 306. Within each IP services edge network 303, multiple shared service customer VPNs may be formed to provide the core network service over VPN. In some embodiments, the IP VPN edge network 302 provides basic VPN service, whereas the IP services edge networks 303 are each associated with a particular network service.

In some embodiments, an IP services edge network 303 can be coupled to its associated core service network 308 at multiple core nodes 306 at different geographic locations. In such embodiments, regional diversity can be maintained for a customer. Such architectures are scalable across multiple geographic sites, without requiring additional IP security tunnels or trunks from each customer network.

Exemplary Operations

Figure 4:
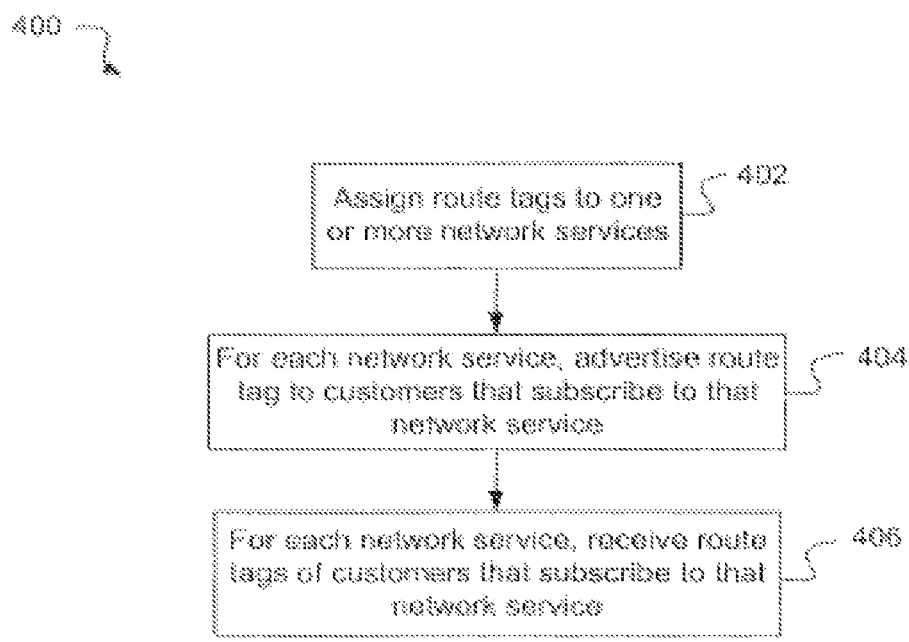
FIGS. 4-6 are flowcharts illustrating an algorithms for providing one or more core network services via VPN.

FIG. 4 is a flow chart illustrating a VPN formation algorithm 400 for forming enterprise and/or core network service VPNs. In a first forming operation 402, one or more core network service VPN(s) are formed logically between customers that subscribe to a given core network service and the core network service node. In another forming operation 404, one or more enterprise VPN(s) are formed logically between network sites of each customer.

In some embodiments, forming a core network service VPN and/or an enterprise VPN can be accomplished through configuring network nodes (e.g., PEs, CEs, and Ps) to import, export and distribute or advertise routes in the appropriate manner. Example processes for configuring and advertising routes are shown in the flowcharts of FIGS. 5-6.

The VPNs formed in forming operations 402 and 404 can more generally be formed over a community of interest. A community of interest is a specified set of networks participating in the VPN. The community of interest may include a single customer or multiple customers, as well as a single core service network or multiple core service networks. For example, two customers, Customer A and Customer B, may want to be part of a common VPN. In this case, an enterprise VPN can be formed that includes the enterprise networks of Customer A and Customer B. In addition, one or more core service networks can be included in the community of interest of Customer A and Customer B. In this case, Customer A and Customer B may use the same core network service VPN. Alternatively, Customer A and Customer B may exclude one or more core service VPNs from their community of interest. When communities of interest are used, each community of interest may be assigned a route target specific to that community of interest. Configuration and advertising of routes associated with communities of interest are discussed further below.

Figure 5:
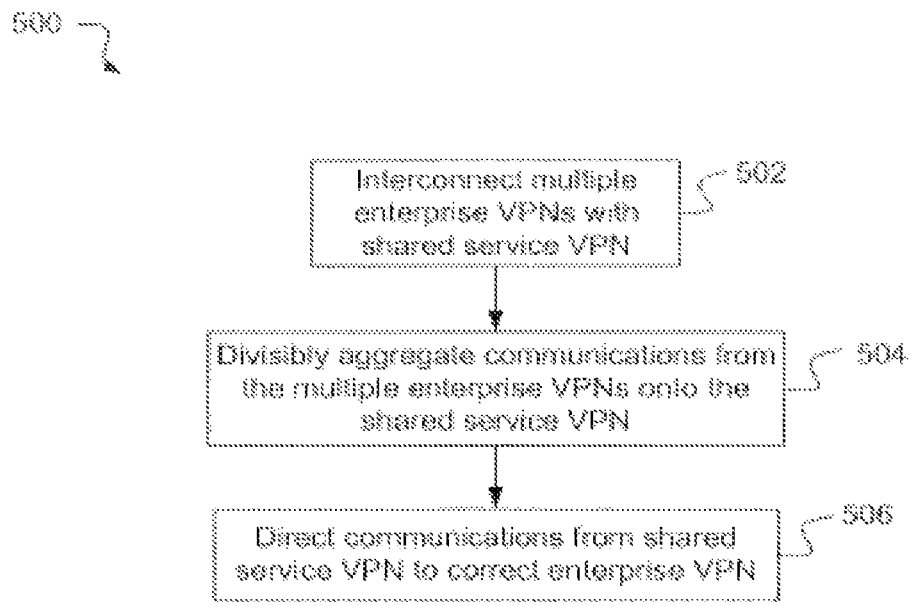
Figure 6:
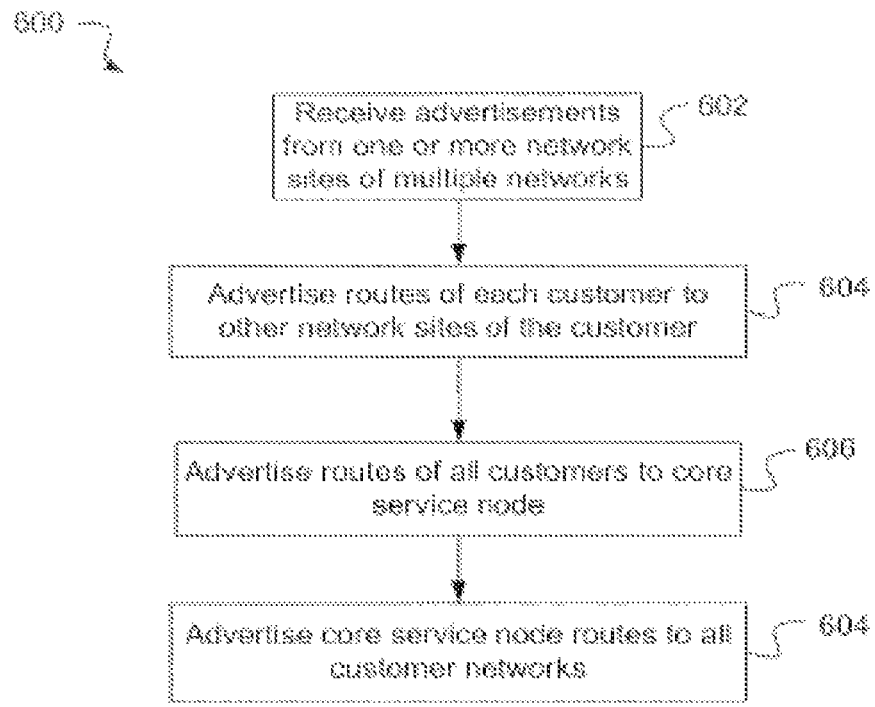

FIG. 5 is a flow chart illustrating a VPN configuration algorithm 500 for configuring network nodes in order to form desired VPNs. These VPNs may be enterprise VPNs, core network service VPNs and/or VPNs defined over a community of interest, which may include multiple customers and/or multiple core service networks.

An assigning operation 502 assigns a customer specific route target to each customer. Examples of customer specific route targets are illustrated in FIG. 1 and FIG. 2, with route target A and route target B. The assigning operation may also or alternatively assign route targets to one or more communities of interest. For example, if Customer A and Customer B are in a community of interest, another route target, for example route target X, can be assigned to the community of interest including Customer A and Customer B.

In another assigning operation 504, a core network service specific route target (also called a core service specific route target) is assigned to each core network service. An example shown above is route target C. Another assigning operation 506, a core service specific customer route target is assigned to each of one or more core network services. An example shown above is route target D.

After assignment of route targets, network nodes, such as PEs, CE, and Ps are configured. Configuring can be performed using VRF technology to set the network nodes to import and export selected routes, based on route targets that are tagged to route advertisements. In a first configuring operation 508, PEs are configured to import core network specific route targets. In another configuring operation 510 the PEs are configured to distribute the core network service specific route target to attached CEs of customers that subscribe to the associated core network service. In another configuring operation 512 PEs are configured to import routes from attached CEs that are tagged with core network service specific customer route targets assigned to the core network service that the customer subscribes to. The configuring operation 512 also distributes the customer routes that are tagged with the core network service specific customer route target(s) to the associated core network service node(s).

In another configuring operation 514, PEs are configured to import routes tagged with the assigned customer specific route target from attached CEs and distribute the customer specific route target to other PEs attached to the same customer and/or customers in the community of interest. In another configuring operation 516, PEs are configured to import routes tagged with customer specific route targets from other PEs attached to the same customers or customers in a community of interest. In configuring operation 516, the PEs are also configured to export the route received from the other PEs of the same customer or community of interest to attached CEs.

In another configuring operation 518, CEs are configured to export routes tagged with customer specific route target and core network service customer specific route target. CEs are also configured to import routes tagged with core service specific route target(s) associated with core services that the customer subscribes to, as well as routes tagged with route targets assigned to the same customer and customers in the community of interest, if any. The foregoing configuring operations can occur in any order and are not limited to the order shown. In addition, the configuring operations may be combined and/or steps of the operations separated into their own operations. After the network nodes are configured, they import, export and advertise routes according to their configurations.

FIG. 6 illustrates a route importing, exporting and distributing algorithm 600 for use in forming one or more enterprise VPNs and/or core network service VPNs. In an advertising operation 602, PEs advertise imported routes that are tagged with a core service specific route target to attached CEs of subscribing customers. In an importing operation 604, PEs import routes tagged with core service specific customer route target(s) from attached CEs and advertise those routes to associated core service node(s). Importing operation 604 enables the associated core network service node(s) to reach the subscribing customers' CEs.

In another importing operation 606, PEs import routes tagged with a customer specific route target and advertise those routes to other customer enterprise networks and enterprise networks in any communities of interest of which the customer is a member. In another operation 608 CEs export routes tagged with an assigned customer specific route target and an assigned core service customer specific route target. CEs also import routes tagged with core network service specific route target(s) and routes tagged with assigned customer specific route targets of the same customer or customers in any communities of interest that the customer is a member of. The order of operations is not limited to that shown in FIG. 6.

Exemplary Computing Device

Figure 7:
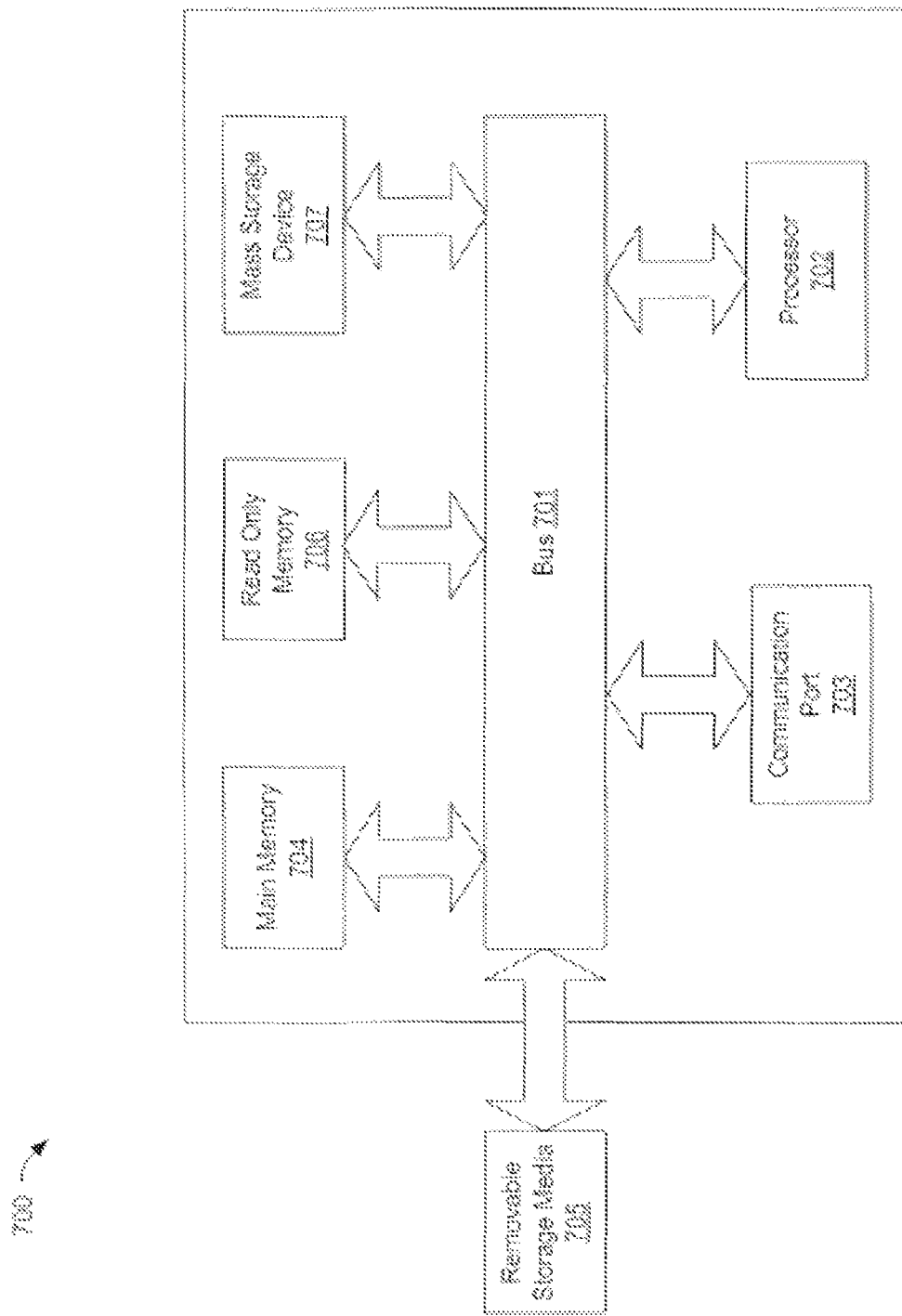
FIG. 7 illustrates a general purpose computing device upon which one or more aspects of embodiments of the present invention may be implemented.

FIG. 7 is a schematic diagram of a computing device 700 upon which embodiments of the present invention may be implemented and carried out. For example, one or more computing devices 700 may be used to advertise route targets to or from an enterprise network and/or a core service network to setup a core network service VPN or shared core network service VPN whereby a core network service can be provided over the shared service VPN. As another example, the computing device 700 can be used to assign route targets to core network services and advertising those route targets to customer networks such that customer networks can access those network services over a core network service VPN. As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

According to the present example, the computing device 700 includes a bus 701, at least one processor 702, at least one communication port 703, a main memory 704, a removable storage media 705, a read only memory 706, and a mass storage 707. Processor(s) 702 can be any known processor, such as, but not limited to, an Intel® Itanium® or Itanium 2® processor(s), AMD® Opteron® or Athlon MP® processor(s), or Motorola® lines of processors. Communication port(s) 703 can be any of an RS-232 port for use with a modem based dialup connection, a 10/100 Ethernet port, a Gigabit port using copper or fiber, or a USB port. Communication port(s) 703 may be chosen depending on a network such a Local Area Network (LAN), Wide Area Network (WAN), or any network to which the computing device 700 connects. The computing device 700 may be in communication with peripheral devices (not shown) such as, but not limited to, printers, speakers, cameras, microphones, or scanners.

Main memory 704 can be Random Access Memory (RAM), or any other dynamic storage device(s) commonly known in the art. Read only memory 706 can be any static storage device(s) such as Programmable Read Only Memory (PROM) chips for storing static information such as instructions for processor 702. Mass storage 707 can be used to store information and instructions. For example, hard disks such as the Adaptec® family of SCSI drives, an optical disc, an array of disks such as RAID, such as the Adaptec family of RAID drives, or any other mass storage devices may be used.

Bus 701 communicatively couples processor(s) 702 with the other memory, storage and communication blocks. Bus 701 can be a PCI/PCI-X, SCSI, or USB based system bus (or other) depending on the storage devices used. Removable storage media 705 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Embodiments of the present invention include various steps, which will be described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A system comprising:
   a plurality of provider edge nodes, wherein each provider edge node is at least one of a router and a switch;
   a plurality of core service networks providing respective core network services, each core service network comprising a core network service node; and
   an edge network comprising at least some of the plurality of provider edge nodes configured to form one or more core network service Virtual Private Networks (VPNs) logically between a plurality customer network sites associated with a customer and the plurality of core service networks,
   wherein the plurality of customer network sites associated with the customer comprises a plurality of customer edge nodes interconnected to corresponding provider edge nodes of the edge network,
   wherein at least some of the provider edge nodes are configured with a community of interest that specifies: (a) a subset of the plurality of customer network sites associated with the customer, and (b) a subset of core network services to which the customer is subscribed;
   wherein at least some of the customer edge nodes are configured to import routes tagged with a core service specific route target associated with the subset of core network services as specified by the community of interest, and
   wherein at least some of the plurality of core network service nodes are configured to export routes tagged with a core service specific route target to the subset of the plurality of customer network sites as specified by the community of interest.

2. A system as recited in claim 1, wherein a plurality of customer network sites are associated with a second customer, and wherein each customer network site associated with the second customer comprises a plurality of second customer edge nodes attached to associated provider edge nodes of the edge network,
   wherein at least some of the provider edge nodes are configured with a second community of interest that specifies: (a) a subset of the plurality of customer network sites associated with the second customer, and (b) a subset of core network services to which the second customer is subscribed.

3. A system as recited in claim 2, wherein at least some of the second customer edge nodes are configured to import routes tagged with a core service specific route target associated with the subset of core network services as specified by the second community of interest.

4. A system as recited in claim 2, wherein at least some of the plurality of core network service nodes are configured to export routes tagged with a core service specific route target to the subset of the plurality of customer network sites associated with the second customer as specified by the second community of interest.

5. A system as recited in claim 2, wherein at least some of the provider edge nodes are configured with a third community of interest that specifies: (a) a subset of the plurality of customer network sites associated with the first customer and the second customer, and (b) a subset of core network services to which the first customer and the second customer are subscribed.

6. A system as recited in claim 1, wherein the at least some of the plurality of provider edge nodes are configured with the community of interest using Virtual Routing and Forwarding (VRF) technology.

7. A system as recited in claim 1, further comprising:
   a plurality of services edge networks comprising at least some of the plurality of provider edge nodes, wherein each core network service node interconnects with the edge network via a respective one of the plurality of services edge networks.

8. A computer-implemented method comprising:
   providing a plurality of provider edge nodes, wherein each provider edge node is at least one of a router and a switch;

providing a plurality of core service networks providing respective core network services, each core service network comprising a core network service node;

providing an edge network comprising at least some of the plurality of provider edge nodes configured to form one or more core network service Virtual Private Networks (VPNs) logically between a plurality of customer network sites associated with a customer and the plurality of core service networks, wherein the plurality of customer network sites associated with the customer comprises a plurality of customer edge nodes interconnected to corresponding provider edge nodes of the edge network;

configuring at least some of the provider edge nodes with a community of interest that specifies: (a) a subset of the plurality of customer network sites associated with the customer, and (b) a subset of core network services to which the customer is subscribed; and configuring at least some of the plurality of core network service nodes to export routes tagged with a core service specific route target to the subset of the plurality of customer network sites as specified by the community of interest, wherein at least some of the customer edge nodes are configured to import routes tagged with a core service specific route target associated with the subset of core network services as specified by the community of interest.

9. A computer-implemented method as recited in claim 8, wherein a plurality of customer network sites are associated with a second customer, and wherein each customer network site associated with the second customer comprises a plurality of second customer edge nodes attached to associated provider edge nodes of the edge network, the method further comprising:

configuring at least some of the provider edge nodes with a second community of interest that specifies: (a) a subset of the plurality of customer network sites associated with the second customer, and (b) a subset of core network services to which the second customer is subscribed.

10. A computer-implemented method as recited in claim 9, further comprising:

configuring at least some of the plurality of core network service nodes to export routes tagged with a core service specific route target to the subset of the plurality of customer network sites associated with the second customer as specified by the second community of interest.

11. A computer-implemented method as recited in claim 9, wherein at least some of the second customer edge nodes are configured to import routes tagged with a core service specific route target associated with the subset of core network services as specified by the second community of interest.

12. A computer-implemented method as recited in claim 9, further comprising:

configuring at least some of the provider edge nodes with a third community of interest that specifies: (a) a subset of the plurality of customer network sites associated with the first customer and the second customer, and (b) a subset of core network services to which the first customer and the second customer are subscribed.

13. A computer-implemented method as recited in claim 8, further comprising:

using Virtual Routing and Forwarding (VRF) technology to configure the at least some of the plurality of provider edge nodes with the community of interest.

14. A computer-implemented method as recited in claim 8, further comprising:

providing a plurality of services edge networks comprising at least some of the plurality of provider edge nodes, wherein each core network service node interconnects with the edge network via a respective one of the plurality of services edge networks.

* * * * *